Nov. 7, 1950 L. L. HYLER 2,529,159
EARTH-MOVING EQUIPMENT
Filed Oct. 24, 1946 4 Sheets-Sheet 1
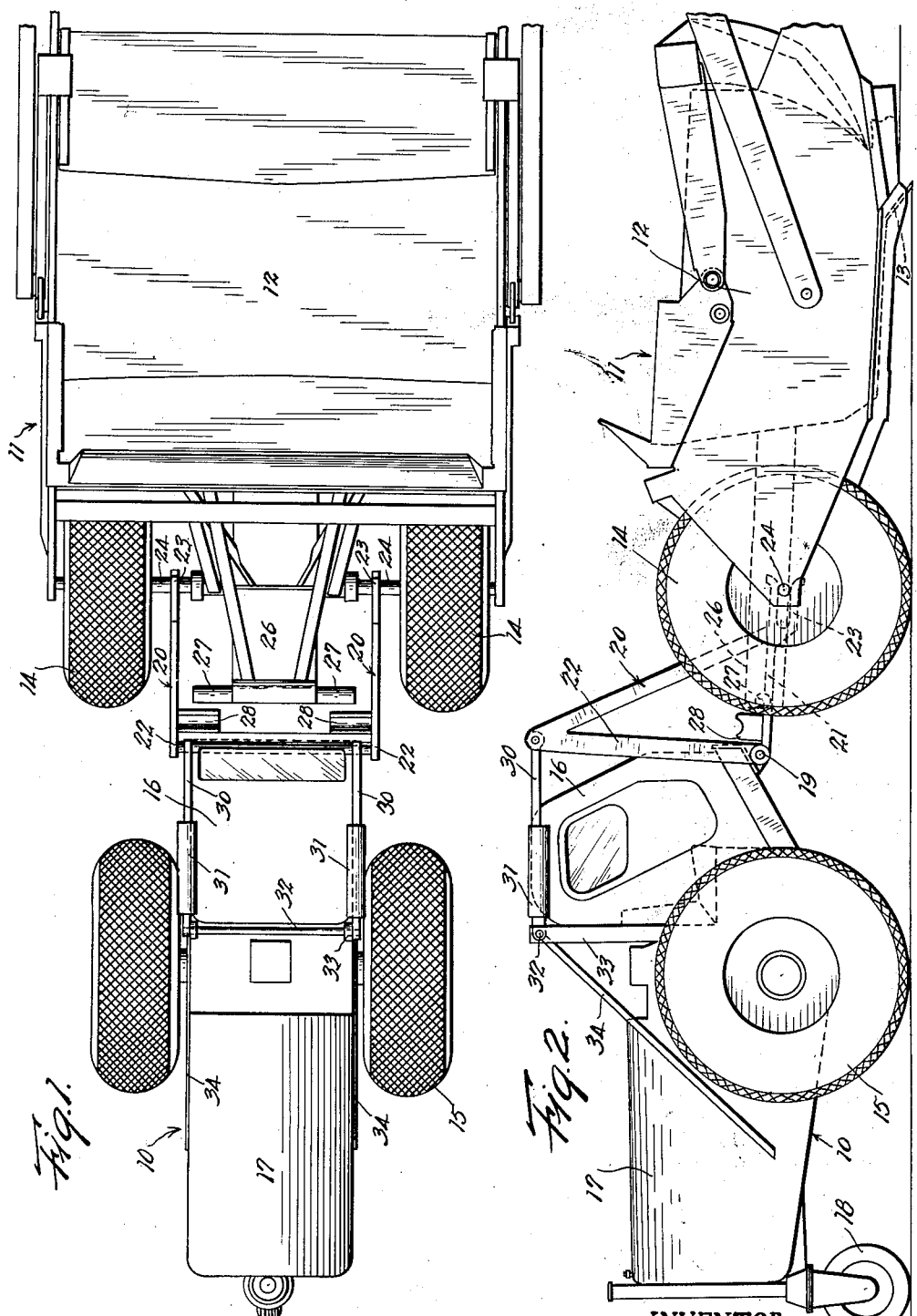
INVENTOR.
Loiell L. Hyler
BY Thiess, Olsen & Mecklenburger
Attys.

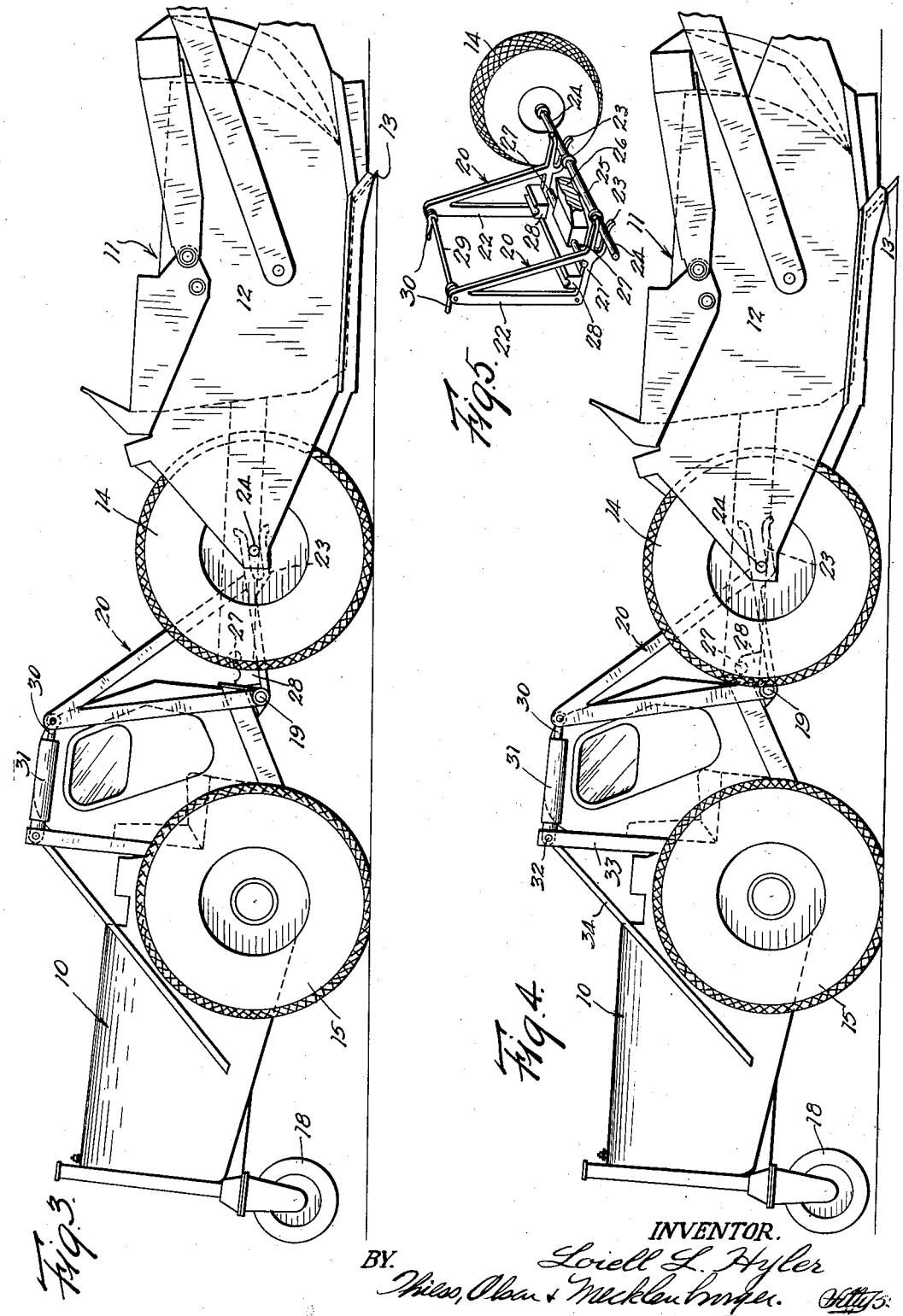

Nov. 7, 1950 L. L. HYLER 2,529,159
EARTH-MOVING EQUIPMENT
Filed Oct. 24, 1946 4 Sheets-Sheet 3

INVENTOR.
Loiell L. Hyler

Nov. 7, 1950 L. L. HYLER 2,529,159
EARTH-MOVING EQUIPMENT
Filed Oct. 24, 1946 4 Sheets-Sheet 4

INVENTOR.
Loiell L. Hyler
BY
Thiess, Olson & Mecklenburger
Attys.

Patented Nov. 7, 1950

2,529,159

UNITED STATES PATENT OFFICE 2,529,159

EARTH-MOVING EQUIPMENT

Loiell L. Hyler, Cedar Rapids, Iowa, assignor to La Plant-Choate Manufacturing Co., Inc., Cedar Rapids, Iowa, a corporation of Delaware Application October 24, 1946, Serial No. 705,353

12 Claims. (Cl. 280—33.13)

This invention relates to earth-moving equipment of the type employed in excavating, transporting and discharging material such as earth, more particularly to pusher tractors for assisting in the propulsion of the earth-moving vehicle or scraper during the excavating and loading operation, and the invention has for an object the provision of improved means for operatively associating the pusher tractor with the earth-moving vehicle.

In the operation of earth movers or scrapers of the type above indicated which are ordinarily drawn by a track-type tractor or other suitable prime mover, it is common practice to employ a second track-type tractor or a bulldozer for pushing the scraper vehicle during loading or excavating so as to add the tractive effort of the pusher tractor or the bulldozer to the tractive effort provided by the draft tractor or prime mover, the vehicle being provided at its rear end with a pusher block for direct contact with the pusher tractor or the bulldozer.

In making an excavation or cut the scraper usually proceeds as far as possible under the tractive effort supplied by its draft tractor or prime mover, and the pusher tractor which is following up does not engage the pusher block to add its tractive effort until the draft tractor has practically stalled. Due to the magnitude of the loads encountered during the excavating and loading operation and to the desirability of loading the scraper bowl to its maximum capacity as quickly as possible, it is desirable that the pusher tractor develop the maximum possible traction. The use of wheel-type tractors in operations of this character offers considerable advantage due to the increased speed and maneuverability of such tractors as compared to track-type units, it is a further object of this invention to provide a wheel-type pusher tractor and an earth-moving vehicle wherein the tractor is positively engaged and locked to the rear end of the vehicle in a fashion such that the load normally supported by the rear wheels of the vehicle is transferred to the traction wheels of the tractor so as to materially increase the tractive effort obtainable from the pusher tractor.

In carrying out the invention in one form the pusher-type tractor is provided with engaging means extending forwardly thereof for engaging a rear portion of the vehicle upon approach of the tractor thereto, the engaging means including pivotally mounted means for locking the engaging means to the vehicle in pushing relation, and the tractor is provided with power means for operating the locked pivotal and engaging means to elevate the rear wheels of the earth-moving vehicle and tilt the tractor thereby to transfer to the traction wheels of the tractor the load normally supported by the rear wheels of the earth-moving vehicle. More particularly, the engaging and pivotally mounted means in one embodiment of the invention comprises a pair of bell cranks each of which has a forwardly extending arm terminating in a fork for receiving trunnions carried by the vehicle when the tractor approaches the rear end of the vehicle. The power means for operating the bell cranks comprises hydraulic ram means connected between the other arms of the bell cranks and the tractor, which rams when foreshortened with the forked arms engaging the vehicle are effective to tilt the tractor so as to elevate the rear wheels thereof. The locking means for the bell cranks comprises cooperating members on the bell cranks and the earth-moving vehicle adapted to interengage upon further approach of the tilted tractor, the hydraulic rams thereafter, when lengthened, being effective to elevate the rear wheels of the earth-moving vehicle so as to transfer to the traction wheels of the tractor the load normally supported by the vehicle wheels.

For a more complete understanding of the invention, reference should now be had to the drawings in which:

Fig. 1 is a plan view of a pusher tractor and earth-moving vehicle provided with cooperating engaging means embodying the present invention, only the rear portion of the earth-moving vehicle being shown;

Fig. 2 is a side elevational view of the tractor and earth-moving vehicle shown in Fig. 1 with the engaging means in the first stage of engagement as the tractor approaches the vehicle;

Fig. 3 is a side elevational view similar to Fig. 2 but showing the tractor tilted so as to raise the rear wheel thereof off the ground;

Fig. 4 is a similar side elevational view showing the engaging means in locked pushing relation with the rear wheels of the earth-moving machine raised off the ground so as to support the rear end of the earth-moving vehicle on the traction wheels of the tractor;

Fig. 5 is a somewhat diagrammatic perspective view of the engaging and locking means shown in Figs. 1 to 4, inclusive;

Figure 6:
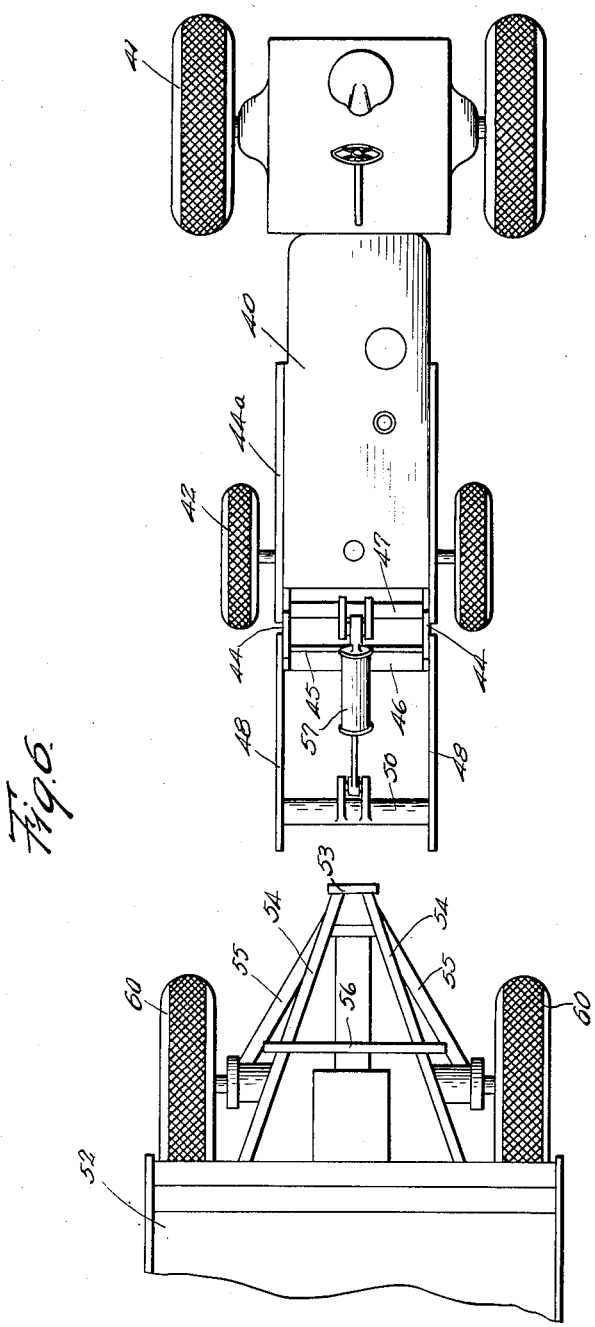
Fig. 6 is a plan view of a pusher tractor and earth-moving vehicle provided with cooperating engaging means constituting another embodiment of the invention.

Referring now to Figs. 1 to 5 of the drawing, the invention is shown as applied to earth-moving equipment comprising a two-wheel pusher tractor 10 and an earth-moving vehicle or scraper 11, only the rear portion of which is shown. The earth-moving vehicle 11 may be of any type well known in the art, such for example as shown in Austin Patent No. 2,360,823, issued October 24, 1944, and comprises the usual bowl 12 having a scraper blade 13 adapted to be raised and lowered in order to accomplish the loading, transportation and discharge of the earth or similar material. The vehicle 11, as shown, is provided at its rear end with a pair of wheels 14 and the front end of the vehicle may be supported in any suitable manner. For example, the vehicle may include a pair of front wheels so as to provide a stable vehicle adapted to be drawn by a conventional tractor or prime mover, or the vehicle 11 may be of the unstable type having means at its front end adapted to be connected to a tractor or prime mover so that a stable combination unit is provided in which a portion of the load of the scraper is carried by the tractor or prime mover.

The two-wheel prime mover 10 includes a pair of traction wheels for supporting a conventional operator's cab 16 and the propelling engine which is located within the hood 17, and at its rear end the pusher tractor 10 is provided with a single rear wheel 18 which is employed for steering the tractor and is connected through suitable means (not shown) to a steering wheel or lever located within the cab 16. Pivotally supported at the front end of the tractor 10 on a suitable shaft 19 is a pair of bell cranks 20 each of which is provided with a forwardly extending arm 21 and an upwardly extending arm 22. Each of the bell crank arms 21 is provided at its forward end with a fork 23 for receiving suitable trunnions 24 on the earth-moving vehicle 11. Although the trunnions 24 may be mounted in any suitable location on the vehicle, they are preferably formed as shown as part of the axle 25 for the rear wheels 14 of the vehicle. Extending rearwardly of the axle 25 so as to project beyond the trunnions 24 is an end plate 26 which carries a second pair of trunnions 27 adapted to be engaged in suitable cradles 28 carried by the bell cranks 20, as will be more fully described hereinafter.

The bell crank arms 22 are connected at their upper ends by a suitable tie rod 29 to which are connected the piston rods 30 of a pair of hydraulic jacks 31, the cylinders of which are connected to a cross rod 32 carried on suitable supports 33 which extend upwardly from the frame of the tractor and are maintained in rigid relation to the tractor frame by diagonal braces 34. It will of course be understood that hydraulic jacks or rams will be connected in the usual fashion to a source of fluid under pressure through control valves capable of selectively applying pressure to the opposite sides of the pistons so as to cause foreshortening or lengthening of the rams which are of the double-acting type well known in the art.

In Fig. 2 the earth-moving vehicle or scraper 11 is shown as having been partially loaded by the tractor or other prime mover attached to its front end, it being noted that the scraper blade 13 is making a cut into the surface of the earth over which the vehicle is passing and the pusher tractor is approaching the rear of the scraper in order to assist in a completion of the loading operation, the forks 23 on the bell crank arms 21 having been adjusted by the tractor operator to the proper level to receive the trunnions 24 and the trunnions having moved partially into the forks 23, as shown in Fig. 2. It will be noted that in this position of the bell cranks 20 the trunnions 27 are at a height such that upon further movement of the tractor toward the vehicle these trunnions will engage the side of the cradles 28 and prevent further movement of the trunnions 24 into the forks 23. Before or upon the occurrence of such engagement the operator of the structure applies pressure to the proper side of the hydraulic rams 31 to cause foreshortening thereof. As the piston rods 30 move into the ram cylinders a force is exerted on the bell cranks 20 tending to rotate these bell cranks in a counter-clockwise direction as viewed in Fig. 2. However, the interengagement of the trunnions 24 and the forks 23 prevents rotation of the bell cranks and instead the tractor 10 is tilted so as to elevate the rear wheel 18, as shown in Fig. 3, and lower the bell cranks and the cradle 28 relative to the trunnions 27.

In Fig. 3 the various parts are shown in an intermediate position in which the tilting of the tractor has not reached its maximum, and it will be understood that the tilting operation is continued until the cradles 28 reach a position below the trunnions 27, whereupon the tractor may be caused to further approach the vehicle 11 until the trunnions 24 engage the inner ends of the slots in the forks 23. In this position the trunnions 27 will be disposed directly above the cradles 28.

In order to complete the interconnection between the pusher tractor and the vehicle 11 the hydraulic jacks are now supplied with pressure tending to cause extension of the jacks. Extension of the jacks tends to rotate the bell cranks 20 in a clockwise direction as viewed in Fig. 4, but upon engagement of the trunnions 27 in the cradles 28 the bell cranks 20 are locked relative to the vehicle 11 and consequently extension of the rams is effective to tilt the tractor in a reverse direction, causing the rear wheel 18 thereof to lower and the shaft 19 and the bell cranks 20 to move upward thus raising the trunnions 24 and 27 to a position in which the rear wheels 14 of the vehicle are clear of the ground, extension of the jacks being stopped before the rear wheel 18 of the tractor again comes in contact with the ground. This position of the various parts is clearly shown in Fig. 4, and it will be observed that the load formerly carried by the rear wheels 18 and 14 of the tractor and the scraper respectively is now supported by the traction wheels 15 of the tractor whereby the tractor is capable of exerting its maximum tractive effort.

Under the combined tractive effort supplied by the pusher tractor 10 and the draft tractor or prime mover of the vehicle the excavating and loading operation may be completed and the scraper blade 13 raised to a position clear of the ground in which position the bowl is closed so as to retain the body of earth therein for transportation to a desired point of discharge. In order to uncouple the pusher tractor from the scraper the hydraulic rams are shortened to lower the bell cranks 20 until the scraper wheels 14 contact the ground and the cradles 28 move away from the trunnions 27 sufficiently to permit the tractor to withdraw from the scraper to a position in which the trunnions 27 are no longer directly over the cradles 28, whereupon the jacks may be lengthened until the tractor steering wheel 18 again contacts the ground. The scraper 11 may then be pulled away from the pusher tractor by its draft tractor or prime mover and the load contained in the scraper bowl 11 transported to the point of discharge, during which time the pusher tractor 10 may be maneuvered to a position awaiting the return of the scraper vehicle for the next excavating or loading operation.

It will be noted that the various coupling and uncoupling operations heretofore described may be carried out while the tractor and scraper are in motion, so long as the relative speeds of the two units are such as to cause the tractor to approach and withdraw from the scraper at the proper times. Elevating the rear wheels of the scraper and the rear wheels of the tractor so as to support the entire load on the traction wheels 15 of the pusher tractor not only insures maximum tractive effort from the tractor 10, but likewise reduces the rolling resistance which would otherwise be exerted by the rear wheels 14 and 18. Consequently, the maximum tractive effort is available for the loading operation.

As heretofore indicated the scraper usually performs the initial portion of the loading operation under the power of its pulling tractor or prime mover alone, and in so doing the cutting edge of the scraper levels the ground over which the pusher tractor must travel in overtaking the scraper. Consequently, the two vehicles move in a common plane and the bell cranks 20 may readily be so adjusted as properly to engage the trunnions 24 and 27 at both sides of the scraper. Operating conditions may be encountered, however, under which the pusher tractor is caused to tilt sidewise as it approaches the scraper, and accordingly it is contemplated in some embodiments of the invention that the tie rod 29 may be omitted and the piston rods 30 of the hydraulic rams may be connected to the respective upper ends of the bell crank arms 22 so as to provide for independent operation of the bell cranks by the rams, whereby proper engagement of the trunnions by the bell cranks may be accomplished even though the tractor is in tilted relation to the scraper.

Figure 7:
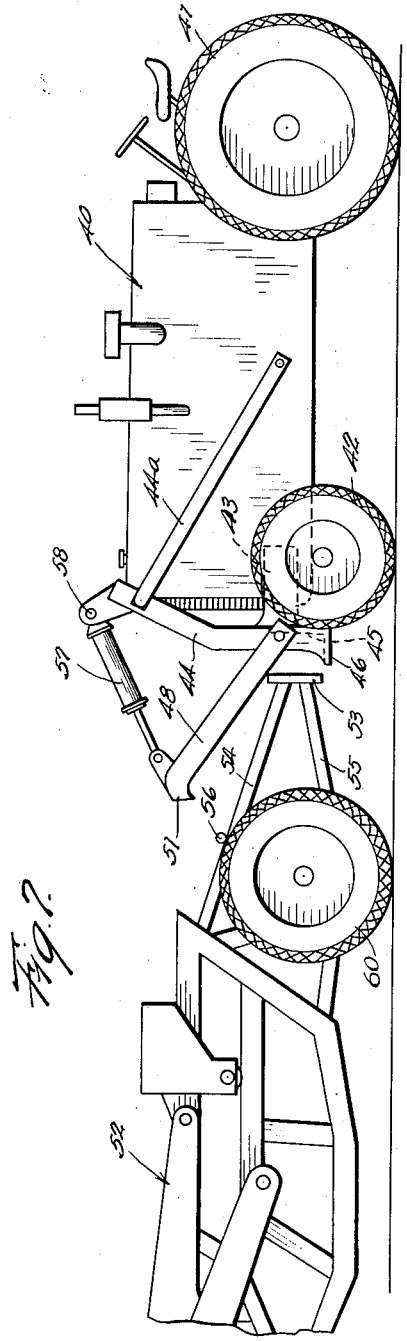
Fig. 7 is a side elevational view of the embodiment shown in Fig. 6 with the pusher tractor approaching the earth-moving vehicle but not yet engaged therewith.
Figure 8:
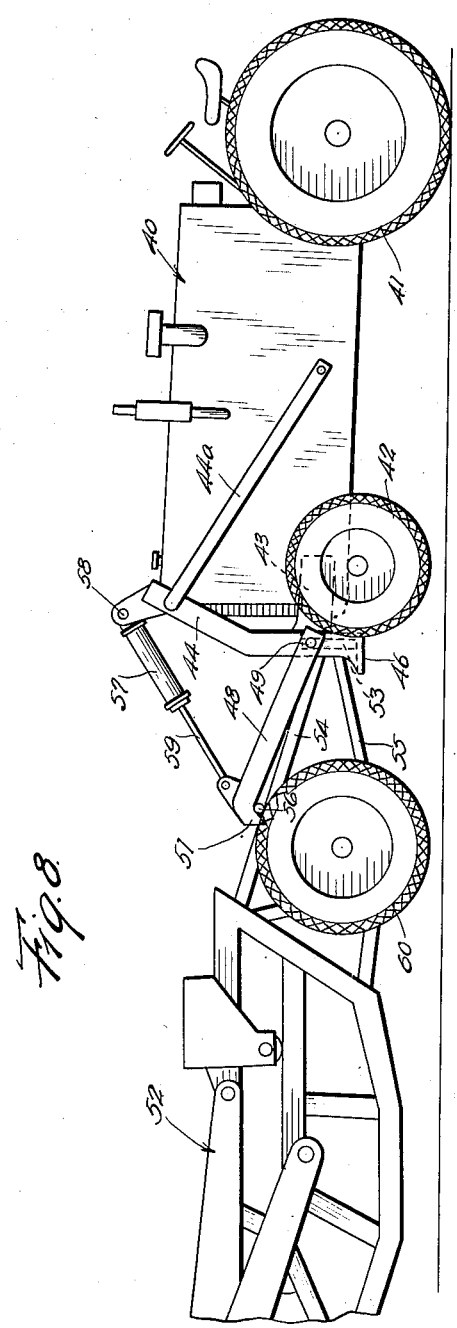
Fig. 8 is a similar side elevational view showing the tractor and earth-moving vehicle of Figs. 6 and 7 with the engaging means in locked pushing relation and the respective rear and front wheels of the vehicle and tractor raised off of the ground so as to support the rear end of the earth-moving vehicle on the rear traction wheels of the tractor.

In the embodiment of the invention shown in Figs. 6, 7 and 8, the pusher tractor 40 includes rear traction wheels 41 and the usual steerable front wheels 42. Mounted on the tractor and extending forwardly therefrom is the vehicle engaging and pushing means which in this embodiment of the invention comprises a pair of side plates or arms 43 that terminate at their respective forward ends in upwardly and downwardly extending members 44. The members 44 are connected adjacent their lower ends by a vertically disposed cross member 45 and a horizontally disposed cross member 46 which together form a socket or shelf for engaging a pusher plate of the earth-moving vehicle as will be hereinafter described.

Adjacent their upper ends the members 44 are provided with suitable braces or struts 44a welded to the tractor 40, as shown, and are likewise connected by an upper cross member 47. Extending outwardly from the members 44 and pivotally connected thereto is a locking frame comprising side arms 48 pivoted to the members 44 on suitable pins 49 and connected adjacent their forward ends by a cross member 50. As shown in Figs. 7 and 8, the forward ends of the arms 48 are shaped to provide hooks or locking portions 51.

The earth-moving vehicle 52 which is of the same general character as the earth-moving vehicle employed in the previously described embodiment of the invention, is provided with a rearwardly mounted pusher plate 53 supported on suitable rearwardly extending upper and lower arms 54 and 55 respectively and a cross shaft or trunnion 56 is secured to the upper arms 54 in spaced relation to the pusher plate 53. In order to provide for pivotal movement of the locking frame formed by the arms 48 and the cross member 50 to effect locking of the tractor 40 to the vehicle 52, power means are provided which in this embodiment of the invention take the form of a single double-acting hydraulic jack 57 having its cylinder pivotally supported on a pin or shaft 58 carried by the cross member 47 and having its piston rod 59 pivotally connected to the cross member 50 of the locking frame. As in the previously described embodiment of the invention, the hydraulic jack or ram is connected in the usual fashion to a source of fluid under pressure through suitable control valves capable of selectively applying pressure to opposite sides of the piston so as to cause shortening or lengthening of the jack as desired. Likewise, as in the previously described embodiment, the cross member 50 which connects the forward ends of the side arms 48 may be omitted and a pair of independently operable hydraulic rams provided for effecting independent movement of the arms 48.

Referring to Figs. 6 and 7, it may be assumed that the earth-moving vehicle 52 has been partly loaded by the tractor or other prime mover attached to the front end of the vehicle and the tractor 40 is shown as approaching the rear end of the vehicle in order to assist in the completion of the loading operation. As the tractor 40 approaches the vehicle 52, the horizontal cross member 46 moves beneath the lower edge of the pusher plate 53 so as to permit the pusher plate to engage the vertical cross member 45 through which the pushing effort of the tractor 40 is exerted on the vehicle 52. In this relative position of the tractor and the vehicle the hooks or locking portions 51 on the arms 48 will assume a position above and slightly forward of the trunnion 56. Accordingly, when the hydraulic jack or ram 57 is extended by proper operation of the control valves associated therewith, the arms 48 will be moved downwardly to cause the hook portions 51 to engage the trunnion 56 and lock the pusher tractor to the vehicle in pushing relation.

Under these conditions it will be seen that the hydraulic jack 57, the pivoted arms 48 and the members 44 form a triangle, the apices of which constitute the pivot pins 49 and 58 and the trunnion 56. Since the two sides of the triangle respectively formed by the arms 48 and the member 44 are of a fixed length, any attempt to further lengthen the hydraulic jack 57 after the hooks 51 have engaged the trunnion 56 can be accomplished only by changing the angles which go to make up the triangle. Consequently, when the jack 57 is further lengthened after the locked relation has been effected, the resulting change in angularity of the above referred to triangle can be accomplished only by an upward movement of the pins 49 which is effective to elevate the front wheels 42 of the tractor 40 and the rear wheels 60 of the earth-moving vehicle 52 as shown in Fig. 8. Thus the load formerly supported on the rear wheels 60 of the earth-moving vehicle and the front wheels 42 of the tractor will be entirely supported on the rear traction wheels 41 of the pusher tractor and on the wheels (not shown) which support the front end of the earth-moving vehicle, and the pusher tractor is thus enabled to exert its maximum tractive effort in the completion of the loading operation.

Upon completion of the loading operation it is necessary only to operate the hydraulic jack 57 so as to shorten the jack, whereupon the front wheels 42 of the tractor and the rear wheels 60 of the earth-moving vehicle will be lowered into engagement with the ground and further shortening of the jack 57 thereupon will move the arms 48 toward the position shown in Fig. 7 so as to release the pusher tractor from the vehicle.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. The combination with a wheel-type pusher-tractor and an earth-moving vehicle, of means pivotally mounted on said tractor and extending forwardly thereof for engaging a rear portion of said vehicle upon approach of said tractor thereto, means responsive to pivotal movement of said means upon further approach of said tractor after initial engagement with said vehicle for locking said means to said vehicle in pushing relation thereto, and hydraulic ram means on said tractor for operating said pivotally mounted means after locking thereof to elevate the rear wheels of said vehicle and transfer to the traction wheels of said tractor the load normally supported on said rear wheels.

2. The combination with a wheel-type pusher-tractor having front traction wheels and an earth-moving vehicle, of a fixed support at the front of said tractor means pivotally mounted on said support and extending forwardly thereof for engaging a rear portion of said vehicle upon approach of said tractor thereto, means responsive to operation of said pivoted means, for locking said last means to said vehicle in pushing relation, and power means on said tractor for operating said pivoted means to locked position, said power means also operating said pivoted means after locking thereof, to elevate the rear wheels of said vehicle to transfer to said front traction wheels the load normally supported by said rear wheels.

3. The combination with a wheel-type pusher-tractor having front traction wheels and an earth-moving vehicle, of means pivotally mounted on said tractor and extending forwardly thereof for engaging a rear portion of said vehicle upon approach of said tractor thereto, means responsive to pivotal movement of said means upon further approach of said tractor after initial engagement with said vehicle for locking said means to said vehicle in pushing relation thereto, and hydraulic ram means on said tractor for operating said pivotally mounted means after locking thereof to elevate the rear wheels of said vehicle and transfer to said front traction wheels the load normally supported on said rear wheels.

4. The combination with a wheel-type pusher-tractor and an earth-moving vehicle, of means pivotally mounted on said tractor and extending forwardly thereof for engaging said earth-moving vehicle in pivotal relation thereto, power means connected between said pivotal means and said tractor and operable upon pivotal engagement of said pivotal means with said vehicle for tilting said tractor to elevate the rear wheels thereof, cooperating means on said pivotal means and on said vehicle engageable when said tractor is tilted to lock said pivotal means against pivotal movement relative to said vehicle and in pushing relation thereto, said power means being operable when said pivotal means is so locked to elevate the rear of said earth-moving vehicle and transfer the weight thereof to the front traction wheels of said tractor.

5. The combination with a wheel-type pusher-tractor and an earth-moving vehicle, of bell crank means pivotally mounted on said tractor and having one arm extending forwardly thereof for engaging said earth-moving vehicle in pivotal relation upon movement of said tractor toward said vehicle, power means connected between the other arm of said bell crank and said tractor for causing pivotal movement therebetween, said pivotal movement when said one arm engages said vehicle causing tilting of said tractor to elevate the rear wheels thereof, and cooperating means on said bell crank and said vehicle engageable when said tractor is tilted and upon further approach of said tractor to said vehicle for locking said arm against pivotal movement relative to said vehicle and in pushing relation thereto, said power means being operable in a reverse direction to effect said locking engagement and thereafter elevate the rear of said earth-moving vehicle to transfer the weight thereof to the front traction wheels of said tractor.

6. The combination with an earth-moving vehicle and a wheel-type pusher-tractor therefor having front traction wheels and rear steering wheel means, of a pair of bell cranks pivotally mounted on said tractor and each having an arm extending forwardly thereof terminating in a fork, trunnions on said vehicle for engagement in said forks upon approach of said tractor thereto, hydraulic ram means connecting the other arm of each bell crank to said tractor for effecting relative movement therebetween, said ram means being effective to rotate said bell crank about said trunnions and tilt said tractor thereby to elevate said steering wheel means, and cooperating means on said tractor and vehicle engageable upon closer approach of said tilted tractor to said vehicle for locking said bell crank against rotation about said vehicle trunnions, said ram means when operated in a direction to effect lowering of said steering wheel means being effective through said locked bell cranks to elevate the rear end of said vehicle whereby a portion of the weight of said vehicle is transferred to said traction wheels.

7. The combination with a wheel-type pusher-tractor and an earth-moving vehicle, of a first pair of trunnions on said vehicle adjacent the axis of the rear wheels thereof, a pair of bell cranks pivotally mounted on said tractor and each having a forwardly extending arm terminating in a fork for receiving said trunnions upon approach of said tractor to the rear of said vehicle, hydraulic ram means connecting the other arm of each of said bell cranks to said tractor, said hydraulic ram means when operated to effect foreshortening thereof with said forks engaging said trunnions being effective to tilt said tractor thereby to elevate the rear end thereof, a second pair of trunnions on said vehicle, means on said bell cranks for engaging said second pair of trunnions to lock said bell cranks relative to said vehicle when said tilted tractor more closely approaches said vehicle, said hydraulic ram means when operated to effect lengthening thereof with said bell cranks in said locked relation being effective to elevate the rear end of said vehicle, whereby the load normally carried by the rear wheels of said vehicle and tractor is transferred to the front traction wheels of said tractor.

8. The combination with a wheel-type pusher-tractor and an earth-moving vehicle, of a fixed support at the front of said tractor, a rearwardly extending rigid construction on said vehicle, locking means for detachably locking said rigid construction to the fixed support, and power means on said tractor for actuating said locking means and for tilting said tractor and vehicle when in locked relation to elevate said fixed support and the rear wheels of said vehicle to transfer to the traction wheels of said tractor the load normally supported by said vehicle rear wheels.

9. The combination with a wheel-type pusher-tractor and an earth-moving vehicle, of a fixed support on the front of said tractor, a rearwardly extending rigid construction on said vehicle, locking means operable upon tilting of said tractor forwardly for detachably locking said rigid construction with respect to said fixed support, and power means on said tractor for tilting said tractor forwardly to lock said vehicle and tractor and for tilting said tractor rearwardly after actuation of said locking means, to elevate said fixed support and the rear wheels of said vehicle to transfer to the traction wheels of said tractor the load normally supported by said vehicle rear wheels.

10. The combination with a wheel-type pusher-tractor and an earth-moving vehicle, of a fixed support on the front of said tractor, a rearwardly extending rigid construction on said vehicle, pivotally mounted means on said fixed support for engaging a rear portion of said vehicle upon approach of said tractor thereto, locking means responsive to pivotal movement of said pivotally mounted means for locking said rigid construction with respect to said fixed support, and power means on said tractor for operating said pivotally mounted means after actuation of said locking means, to elevate said fixed support and the rear wheels of said vehicle to transfer to the traction wheels of said tractor the load normally supported by said vehicle rear wheels.

11. The combination with a wheel-type pusher-tractor and an earth-moving vehicle, of a fixed support on the front of said tractor, a rearwardly extending rigid construction on said vehicle, bell crank means pivotally mounted on said fixed support having one arm extending forwardly thereof for engaging a rear portion of said vehicle upon approach of said tractor thereto, locking means responsive to pivotal movement of said bell crank means for locking said rigid construction with respect to said fixed support, and power means connected between another arm of said bell crank means and said tractor for operating said bell crank after actuation of said locking means to elevate said fixed support and the rear wheels of said vehicle to transfer to the traction wheels of said tractor the load normally supported by said vehicle rear wheels.

12. The combination with a wheel-type pusher-tractor and an earth-moving vehicle, of a fixed support on the front of said tractor, a rearwardly extending rigid construction on said vehicle, bell crank means pivotally mounted on said fixed support having one arm extending forwardly thereof for engaging a rear portion of said vehicle upon approach of said tractor thereto, locking means responsive to pivotal movement of said bell crank means for locking said rigid construction with respect to said fixed support, and hydraulic ram means connected between another arm of said bell crank means and said tractor for operating said bell crank after actuation of said locking means to elevate said fixed support and the rear wheels of said vehicle to transfer to the traction wheels of said tractor the load normally supported by said vehicle rear wheels.

LOIELL L. HYLER.

REFERENCES CITED

The following references are of record in the file of this patent:

UNITED STATES PATENTS

| Number | Name | Date |
|---|---|---|
| 1,939,950 | Brown | Dec. 19, 1933 |
| 2,382,449 | Simmons | Aug. 14, 1945 |